Sept. 22, 1964　　　　D. R. TANGUY　　　　3,150,314
APPARATUS FOR ELECTROMAGNETICALLY INVESTIGATING EARTH FORMATIONS
INCLUDING MEANS FOR OBTAINING A RESISTIVITY
SIGNAL DIRECTLY
Filed June 16, 1958　　　　　　　　　　　　2 Sheets-Sheet 1

Denis R. Tanguy
INVENTOR.

BY *Richard E. Bee*

ATTORNEY

Denis R. Tanguy
INVENTOR.

BY Richard E. Bee

ATTORNEY

United States Patent Office 3,150,314
Patented Sept. 22, 1964

3,150,314
APPARATUS FOR ELECTROMAGNETICALLY INVESTIGATING EARTH FORMATIONS INCLUDING MEANS FOR OBTAINING A RESISTIVITY SIGNAL DIRECTLY
Denis R. Tanguy, Houston, Tex., assignor to Schlumberger Well Surveying Corporation, Houston, Tex., a corporation of Texas
Filed June 16, 1958, Ser. No. 742,162
16 Claims. (Cl. 324—6)

This invention relates to electrical apparatus for investigating subsurface earth formations traversed by a borehole and, particularly, to such apparatus of the induction type which utilizes a system of coils for electromagnetically inducing current flow in the formations and for obtaining indications of such current flow.

It has become accepted practice to obtain records or logs of the electrical conductivity of subsurface earth formations by utilizing various types of coil systems which are lowered into a well or borehole which traverses the formations. The output signal developed by such a coil system is processed and usually recorded by means of a signal recorder located at the surface of the earth. In general, the signal from such a coil system is processed to derive an output signal that is directly proportional to the conductivity of the subsurface formation adjacent the coil system, i.e., any reactance components are eliminated. It is, however, many times desirable to compare the logs obtained with a coil system with those obtained by means of an electrode system where the electrode system logs are plotted in terms of formation resistivity and not formation conductivity. As is quite well known, resistivity is the reciprocal of conductivity and, consequently, it has become the customary practice to reciprocate the coil system output signal before it is applied to the signal recorder and thereby provide a coil system log which is plotted in terms of formation resistivity.

The reciprocal of the coil system output signal has been heretofore obtained by utilizing an additional piece of apparatus such as a servo type reciprocator or else by utilizing a special nonlinear electronic circuit capable of developing an output signal which is the reciprocal of the input signal. While such devices and circuits usually perform satisfactorily, it would nevertheless be desirable to have a new and improved way of obtaining a coil system log plotted in terms of resistivity without having to resort to the use of such additional apparatus.

It is an object of the invention, therefore, to provide new and improved coil system apparatus capable of providing a coil system log plotted in terms of resistivity without need for additional apparatus for reciprocating the coil system output signal.

It is a further object of the invention to provide new and improved coil system apparatus which makes use of many of the parts normally associated with coil systems for obtaining an output signal which is directly representative of formation resistivity.

In accordance with the invention, apparatus for investigating earth formations traversed by a borehole comprises a coil array including a transmitter coil and a receiver coil adapted for movement through the borehole. The apparatus further comprises circuit means for supplying current to the transmitter coil for developing in the receiver coil a signal representative of a formation electrical characteristic. The apparatus also includes means responsive to the receiver coil signal for adjusting the transmitter coil current to hold such receiver coil signal to a predetermined signal condition. In addition, the apparatus includes means responsive to the transmitter coil current for providing indications of formation resistivity.

For a better understanding of the present invention, together with other and further objects thereof, reference is had to the following description taken in connection with the accompanying drawing, the scope of the invention being pointed out in the appended claims.

Referring to the drawings.

Figure 1:
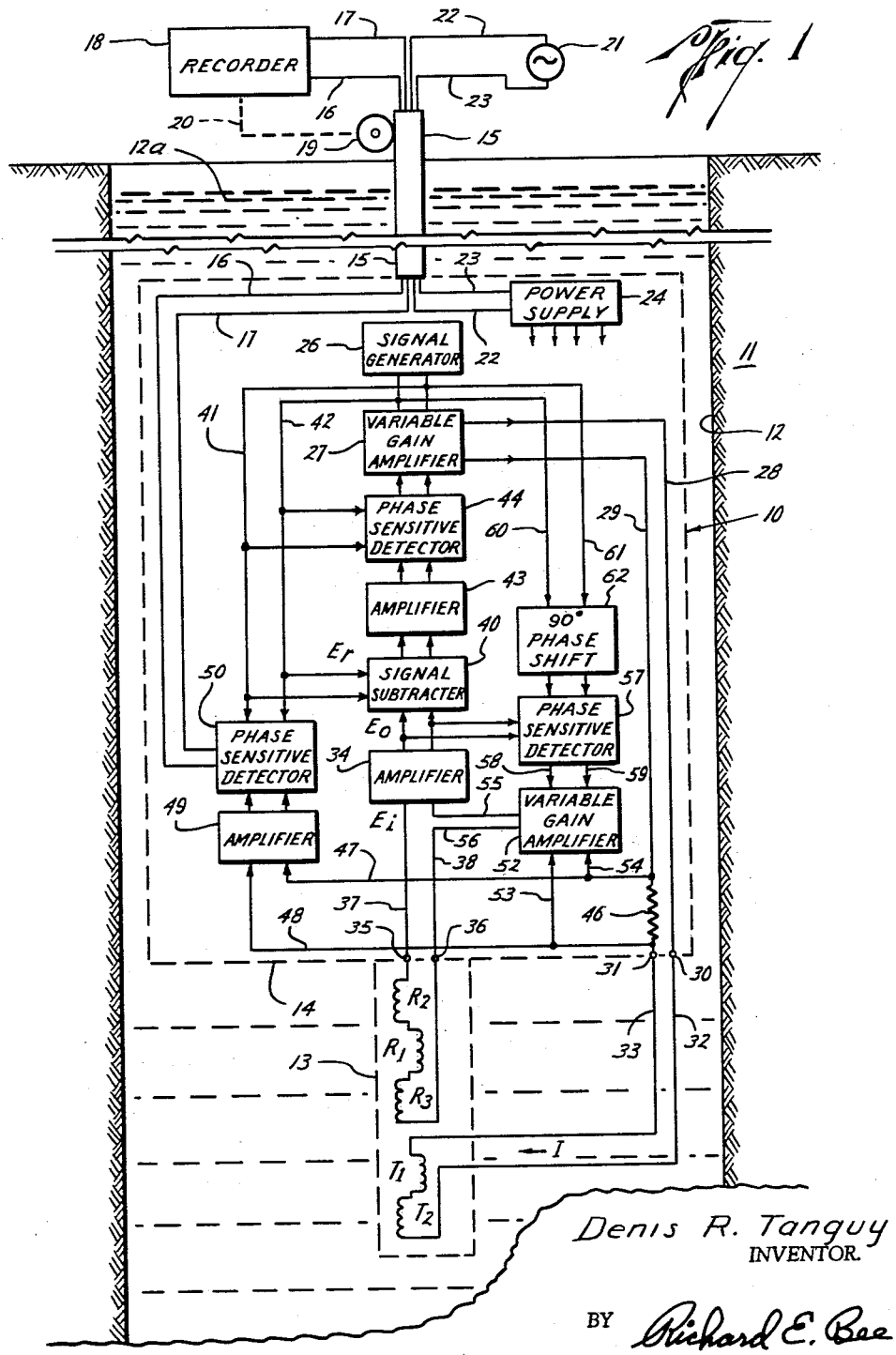
FIG. 1 is a schematic diagram of one embodiment of coil system apparatus constructed in accordance with the present invention.

Referring to FIG. 1 of the drawings, there is shown a representative embodiment of apparatus 10 constructed in accordance with the present invention for investigating earth formations 11 traversed by a borehole 12. The borehole 12 may be filled with a drilling liquid or drilling mud 12a. The apparatus 10 includes a coil array 13 mechanically connected to a fluid-tight electronic cartridge or housing 14. The housing 14 is, in turn, mechanically connected by way of an armored multiconductor cable 15 to a suitable winch mechanism (not shown) located at the surface of the earth for raising and lowering the housing 14 and coil array 13 in the borehole 12.

Conductors 16 and 17 of the multiconductor cable 15 are connected to a recorder 18 located at the surface of the earth for making a permanent record of the output signals developed by the downhole portion of the apparatus. A mechanical drive wheel 19 engages the cable 15 and, in turn, is coupled by suitable mechanical linkage indicated by dash line 20 to the recorder 18 for advancing the recording medium as the downhole apparatus is moved through the borehole 12. In this manner, a record or log is obtained of the output signals plotted in terms of the the depth of the apparatus in the borehole 12.

Electrical power for energizing the various downhole electronic circuits in the housing 14 is supplied by an alternating-current power source 21 by way of additional conductors 22 and 23 of the cable 15 to the downhole portion of the apparatus. The downhole portion of the apparatus includes a suitable power supply 24 which furnishes direct-current power distribution to the various units which require it.

The coil array 13 includes at least one transmitter coil and at least one receiver coil which are adapted for movement together through the borehole 12. Frequently, several transmitter coils as well as several receiver coils may be utilized to make up the array. This is the case illustrated in the FIG. 1 embodiment where the array 13 includes a pair of transmitter coils $T_1$ and $T_2$ and three receiver coils $R_1$, $R_2$ and $R_3$. These coils are constructed and their relative polarities and spacings are determined in accordance with the principles set forth in U.S. Patent 2,582,314 of H. G. Doll entitled "Electromagnetic Well Logging System," granted January 15, 1952. As indicated in this patent, the use of several transmitter and receiver coils enables a focussing action to be obtained whereby the region surrounding the coils to which the system is primarily responsive may be limited in a desired manner.

The apparatus contained within housing 14 includes circuit means for supplying alternating current to the transmitter coils $T_1$ and $T_2$ for developing across the receiver coils $R_1$, $R_2$ and $R_3$ a signal represenative of a formation electrical characteristic which, in most cases, will include a component responsive to the formation conductivity. This supply circuit means includes a signal generator 26 for generating a constant amplitude alternating-current signal having a frequency of, for example, 20 kilocycles per second. The supply circuit means also includes a variable gain circuit represented by a variable gain amplifier 27 for passing a controllable amount of the amplitude of the generator 26 alternating current to the transmitter coils $T_1$ and $T_2$. To this end, the output of the variable gain amplifier 27 is coupled by way of conductors 28 and 29, terminals 30 and 31 and conductors 32 and 33 to the transmitter coils $T_1$ and $T_2$.

The apparatus within housing 14 also includes feedback means responsive to the receiver coil signal for adjusting the transmitter coil current to hold such receiver coil signal to a predetermined signal condition such as, for example, by holding the receiver coil signal substantially constant. In the illustrated embodiment, this feedback means includes an amplifier 34 connected to terminals 35 and 36 associated with the receiver coils $R_1$, $R_2$ and $R_3$ by way of conductors 37 and 38. The output side of the amplifier 34 is, in turn, connected to a signal subtracter 40. An alternating-current reference signal of predetermined magnitude and having the same phase as the transmitter coil current is also supplied to the signal subtracter 40 by the signal generator 26 by way of conductors 41 and 42. Signal subtracter 40 then constitutes circuit means responsive to both the receiver coil signal and the reference signal supplied by conductors 41 and 42 for developing an alternating-current output signal representative of the difference between these two signals.

The signal subtracter 40 may take the form of a transformer having a pair of primary windings with the receiver coil signal and the reference signal being supplied to these primary windings with opposing polarities. In this manner, the output signal across the secondary winding represents the difference between the two input signals. Instead, the signal subtracter 40 may take the form of a difference amplifier having the two signals supplied to the input side thereof with opposite polarities.

The feedback means also includes an amplifier 43 and a phase sensitive detector 44 which is responsive to the difference signal from the subtracter 40 for developing a direct-current control signal representative of the resistive component of the difference signal. By resistive component is meant that component of the difference signal which is in phase with the current supplied to the transmitter coils $T_1$ and $T_2$. Any signal component, on the other hand, which is 90° out of phase with the current supplied to the transmitter coils will be referred to as a reactive component. A phase reference signal having the same phase as the transmitter coil current for sensitizing the phase sensitive detector 44 is supplied thereto from the signal generator 26 by way of conductors 41 and 42. The feedback means is completed by coupling the output side of the phase sensitive detector 44 to the variable gain amplifier 27 for supplying thereto the direct-current control or biasing signal. The control signal adjusts the amplifier gain and, hence, the transmitter coil current inversely with respect to any change in the receiver coil signal from a desired value determined by the magnitude of the reference signal to reduce the difference signal from the signal subtracter 40 to zero.

The FIG. 1 apparatus also includes means responsive to the transmitter coil current for providing indications of formation resistivity. This means includes a measuring resistor 46 of relatively small resistance value coupled in the transmitter current path and responsive to the flow of transmitter coil current for developing a voltage proportional thereto. Measuring resistor 46 is preferably of the noninductive type. This indicating means also includes conductors 47 and 48 connecting measuring resistor 46 to an amplifier 49, which is, in turn, coupled to a phase sensitive detector 50, the latter developing a direct-current output signal proportional to the magnitude of the transmitter coil current. This output signal is then supplied by way of the conductors 16 and 17 to the recorder 18 located at the surface of the earth. A phase-sensitizing voltage for the phase sensitive detector 50 is supplied thereto from the signal generator 26 by way of conductors 41 and 42, this reference signal having the same phase as the transmitter coil current.

As indicated in the above-mentioned Doll Patent 2,582,314, the transmitter and receiver coils do not all have the same winding polarities and number of turns and, hence, this array of coils may be initially balanced so that the direct mutual coupling between transmitter and receiver coil groups is substantially zero. In other words, the coils are balanced so that the net reactive component appearing at the terminals 35 and 36 due to direct mutual coupling is substantially zero. In order to insure that the condition of zero reactive component at the input of the amplifier 34 is accurately maintained as borehole conditions vary, the FIG. 1 apparatus may further include a second feedback means responsive to any reactive component of the receiver coil signal for adding an opposite polarity reactive component to the receiver coil signal for minimizing the net reactive component therein.

As illustrated in FIG. 1, this second feedback means includes a variable gain amplifier 52 responsive to the transmitter current signal supplied thereto by way of the measuring resistor 46 and conductors 53 and 54 for adding to the receiver coil signal a controllable signal whose phase corresponds to a reactive component of opposite polarity. Thus, the output circuit of amplifier 52 is connected by way of conductors 55 and 56 in series circuit relation with the receiver coils and the amplifier 34. This second feedback means also includes a phase sensitive detector 57 responsive to the net reactive component appearing at the output of amplifier 34 for supplying a gain control signal to the variable gain amplifier 52 by way of conductors 58 and 59 for adjusting the magnitude of the added, opposite-polarity, reactive component to minimize the net reactive component appearing at the input of the amplifier 34. A suitable phase-sensitizing signal for the phase sensitive detector 57 is supplied thereto from the signal generator 26 by way of conductors 60 and 61 and a 90° phase shift circuit 62, the latter serving to cause the phase-sensitizing signal to be 90° out of phase with the transmitter coil current and, hence, in phase with the reactive components.

Figure 2:
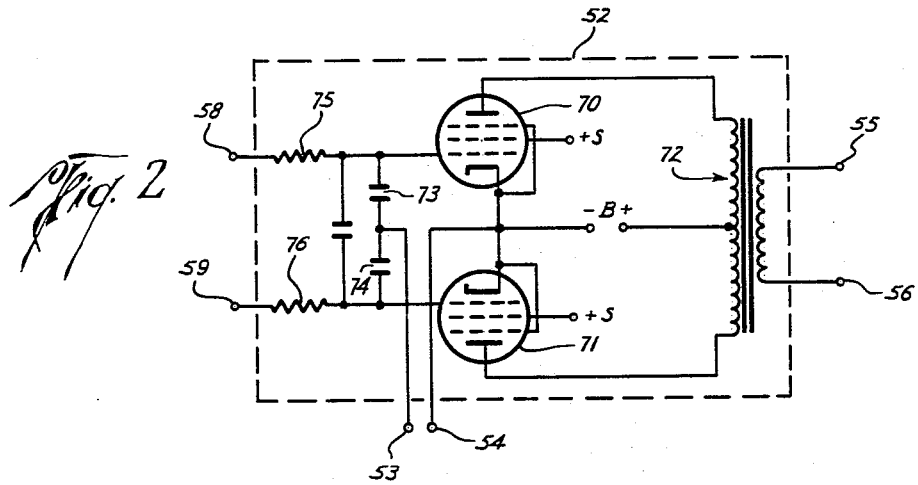
FIG. 2 is a circuit diagram showing the details of one of the units of the FIG. 1 apparatus.

In order to insure that either a positive or a negative net reactive component appearing across the receiver coils $R_1$, $R_2$ and $R_3$ may be cancelled by the second feedback means, the variable gain amplifier 52 is preferably of the balanced type capable of developing a signal of reactive phase that is of either polarity. Likewise, the phase sensitive detector 57 should be of the balanced type. The details of a suitable balanced type variable gain amplifier are shown in FIG. 2 of the drawings. As there indicated, balanced operation is obtained by using a pair of pentode type electron tubes 70 and 71 connected in push-pull to an output transformer 72. The alternating-current signal developed across the measuring resistor 46 is supplied in parallel by way of conductors 53 and 54 and condensers 73 and 74 to the control electrodes of the tubes 70 and 71. The direct-current control or bias signal from the phase sensitive detector 57, on the other hand, is supplied in push-pull by way of the conductors 58 and 59 and resistors 75 and 76 to bias the control electrodes of the tubes 70 and 71. Suitable direct-current operating voltages for tubes 70 and 71 are supplied by way of the S and B terminals.

If the value of the direct-current control signal supplied by way of the conductors 58 and 59 is zero, then no net output signal will be developed across the secondary of output transformer 72 because the currents flowing in the transformer primary will be equal in magnitude and opposite in polarity. If this bias signal assumes a definite value of one polarity, then the circuit is unbalanced in one direction and an output signal of a first polarity is developed across the secondary of transformer 72. If, however, the bias signal assumes an opposite polarity, then the circuit is unbalanced in the other direction and the polarity of the output signal across the secondary of transformer 72 is reversed.

Thus, the variable gain amplifier 52 serves to amplify the alternating-current signal supplied by way of the conductors 53 and 54 and both the polarity and magnitude of the signal which appears on the output conductors 55 and 56 is under the control of the direct-current biasing signal from the phase sensitive detector 57. The use of pentode type electron tubes and the output transformer 72 additionally serves to impart a 90° phase shift to the alternating-current signal so that the signal appearing across the transformer 72 secondary is of the proper phase to cancel the receiver coil reactive components. The fact that the alternating-current driving signal supplied by way of conductors 53 and 54 varies in magnitude with variations in transmitter coil current is advantageous because the drive is greatest when the transmitter coil current is greatest and, hence, when the net reactive component is also most likely to be the greatest.

Considering now the operation of the FIG. 1 apparatus, the signal generator 26 is effective to generate an alternating-current signal which is supplied by way of the variable gain amplifier 27 and the conductors 28 and 29 and the conductors 32 and 33 to the transmitter coils $T_1$ and $T_2$. As a result, a current I flows through the transmitter coils $T_1$ and $T_2$. This, in turn, induces circulating currents in the portion of the earth formations 11 adjacent the coils. Neglecting any reactance components, the magnitude of these currents is proportional to the conductivity of these adjacent portions of the formations 11. These circulating earth currents, in turn, induce a net resistive signal $E_i$ across the receiver coils $R_1$, $R_2$ and $R_3$. The relationship between the net resistive component $E_i$ and the formation conductivity C is expressed by the following mathematical relationship:

$$E_i = kCI \quad (1)$$

where $k$ is a proportionality constant. For the case of a homogeneous formation, the conductivity C represents the true formation conductivity, while for a non-homogeneous formation C denotes the apparent formation conductivity. It will be assumed for the present that any reactive components are suitably balanced out by the coil array or else cancelled by the inverse feedback from the variable gain amplifier 52 so that effectively no such reactive components appear at the input of the amplifier 34.

The receiver coil signal $E_i$ appearing at the input of the amplifier 34 is amplified by the amplifier 34 to develop at the output thereof an output signal $E_o$ which may be described mathematically as:

$$E_o = GkCI \quad (2)$$

where G denotes the gain constant of the amplifier 34. This output signal $E_o$ is then supplied to the signal subtracter 40. Also supplied to the signal subtracter 40 is a constant magnitude alternating-current reference signal $E_r$ having the same phase as the resistive signal $E_i$. Signal subtracter 40 serves to subtract these two signals and the difference signal resulting therefrom is then supplied by way of the amplifier 43 to the phase sensitive detector 44 which develops a direct-current bias signal for controlling the gain of the variable gain amplifier 27. This feedback connection to the variable gain amplifier 27 is chosen to provide an inverse type of feedback such that the magnitude of the transmitter coil current I is adjusted inversely to any change in the receiver coil signal $E_i$. In other words, this feedback loop constitutes a negative feedback loop which works to reduce the net signal supplied to the signal subtracter 40 to zero. This net signal corresponds to the difference between the amplifier 34 output signal $E_o$ and the reference signal $E_r$ and, hence, will approach zero as the magnitude of $E_o$ becomes equal to the magnitude of the reference signal $E_r$.

Assuming this condition to obtain, then the term $E_o$ in Equation 2 may be replaced by $E_r$ and the equation solved for the transmitter coil current I. This results in the following mathematical expression:

$$I = \frac{E_r}{GkC} = \left(\frac{E_r}{Gk}\right)R \quad (3)$$

R denotes the formation resistivity and is the reciprocal of the formation conductivity C. Grouping the constant terms in Equation 3 and replacing them by the symbol $k'$ gives the following mathematical expression for the relationship between the formation resistivity R and the transmitter coil current I:

$$I = k'R \quad (4)$$

Thus, the transmitter coil current is directly proportional to the formation resistivity which is the quantity which it is desired to record. This results because the feedback loop serves to hold the resistive component of the receiver coil signal substantially constant at a value determined by the reference signal $E_r$ by proper feedback adjustment of the transmitter coil current I. Note that this feedback loop is rendered insensitive to any reactive components that may still remain at the output of the amplifier 34 by the use of the phase sensitive detector 44 which serves to discriminate against such components.

From the foregoing, it is seen that the transmitter coil current I and, hence, the voltage developed across the measuring resistor 46 is directly proportional to the formation resistivity. This measure signal developed across the resistor 46 is amplified by the amplifier 49 and converted from an alternating-current to a direct-current signal by the phase detector 50 which, at the same time, serves to discriminate against any unwanted reactive components. The resulting direct current measure signal from the detector 50 is then supplied by way of conductors 16 and 17 to the recorder 18 located at the surface of the earth. The recorder is then effective to record or log the variations in this measure signal and these variations are in terms of formation resistivity, thus enabling the desired resistivity log to be obtained directly without having to use an additional reciprocator device or circuit.

Figure 3:
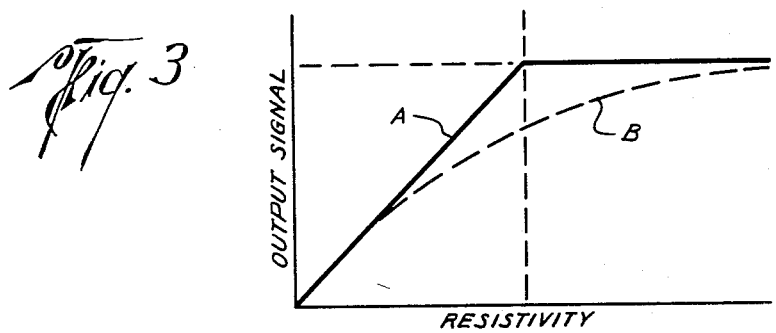
FIG. 3 is a graph utilized in explaining the operation of the invention.

Referring now to the FIG. 3 graph, curve A illustrates how the output measure signal from the phase sensitive detector 50 varies as a function of the formation resistivity. It is seen from curve A that as the formation resistivity R increases, then the increasing amounts of output measure signal correspond to the increasing amounts of transmitter coil current I that are required to make the amplified receiver coil signal $E_o$ equal to the reference signal $E_r$. As indicated by both Equation 4 and curve A, this is a linear relationship. As the formation resistivity continues to increase a point is eventually reached, however, where the variable gain amplifier 27 is putting out all the transmitter coil current I of which it is capable and, hence, for further increases in formation resistivity the transmitter coil current and, hence, the output signal remains constant. In other words, the FIG. 1 apparatus has a maximum operating limit above which it will no longer provide indications of formation resistivity. By suitable construction of the apparatus, however, this upper limit may be chosen so that the apparatus is capable of measuring a resistivity range which is sufficiently wide to include most of the resistivity values commonly encountered.

Figure 4:
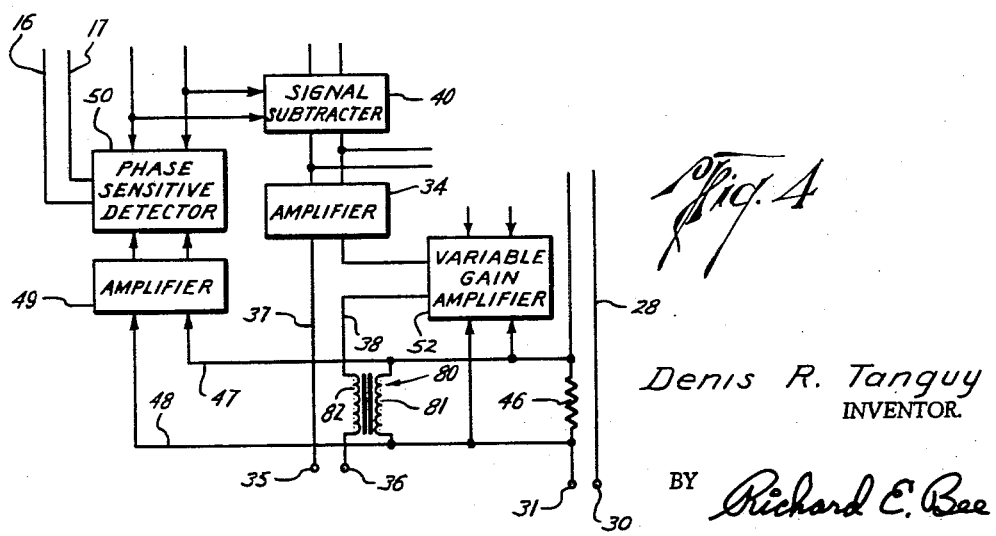
FIG. 4 is a schematic diagram of a modified portion of the FIG. 1 apparatus.

Referring now to FIG. 4 of the drawings, there is shown how a portion of the FIG. 1 apparatus may be modified so that such apparatus will be capable of measuring the entire range of formation resistivities from zero to infinity. Corresponding units are given the same reference numerals as in FIG. 1.

A full range of resistivity values, i.e., from zero to infinity, is made possible by utilizing circuit means responsive to the transmitter coil current for adding a signal to the input of the feedback loop already described for holding constant the receiver coil signal. As illustrated in FIG. 4, this may be done by utilizing an additional transformer 80 having a primary winding 81 coupled across the measuring 46 and a secondary winding 82 connected in series with the receiver coils $R_1$, $R_2$ and $R_3$, the amplifier 34 and the amplifier 52. In this manner, as the transmitter coil current I increases with increasing formation resistivities, then an increasing signal is added by the transformer secondary 82 to the normal receiver coil signal. As a result, the transmitter coil current I does not have to increase as much as in the previous example in order that the total signal appearing at the output of the amplifier 34 will become equal to the reference signal $E_r$. Consequently, less change in transmitter coil current I is required to balance the feedback loop as the formation resistivity increases. This serves to compress the changes in transmitter coil current with formation resistivity and, hence, produces a compressed output signal from the phase sensitive detector 50 as indicated by curve B of FIG. 3. Thus, the apparatus of the present invention may be made to measure the entire range of resistivities from zero to infinity. Note that infinite resistivity corresponds to the case where the variable gain amplifier 27 is supplying its maximum output.

Because the output measure signal is compressed, the scale calibrations of the recorder 18 will have to be compressed in a similar manner. For the case of a recorder which provides a continuous trace on a recording medium such as film, this means that the resistivity values associated with the resistivity coordinates on the film must follow the same compression law followed by the downhole portion of the apparatus. As seen from curve B of the FIG. 3 graph, the lower range of resistivity values, which are frequently of greatest interest from a quantative standpoint, will still be plotted in a nearly linear fashion.

While there have been described what are at present considered to be preferred embodiments of this invention, it will be obvious to those skilled in the art that various changes and modifications may be made therein without departing from the invention and it is, therefore, aimed to cover all such changes and modifications as far within the true spirit and scope of the invention.

What is claimed is:

1. In apparatus for investigating earth formations traversed by a borehole, the combination comprising: a coil array including a transmitter coil and a receiver coil adapted for movement through the borehole; circuit means for supplying current to the transmitter coil for developing in the receiver coil a signal representative of a formation electrical characteristic; means responsive to the receiver coil signal for adjusting the transmitter coil current to hold such receiver coil signal to a predetermined signal condition; and means responsive to the transmitter coil current for providing indications of formation resistivity.

2. In apparatus for investigating earth formations traversed by a borehole, the combination comprising: a coil array including a transmitter coil and a receiver coil adapted for movement through the borehole; circuit means for supplying current to the transmitter coil for developing in the receiver coil a signal representative of formation conductivity; feedback means responsive to the receiver coil signal for adjusting the transmitter coil current inversely to any change in such receiver coil signal; and means responsive to the transmitter coil current for providing indications of formation resistivity.

3. In apparatus for investigating earth formations traversed by a borehole, the combination comprising: a coil array including a transmitter coil and a receiver coil adapted for movement through the borehole; circuit means for supplying current to the transmitter coil for developing in the receiver coil a signal representative of formation conductivity; feedback means responsive to the receiver coil signal for adjusting the transmitter coil current to hold such receiver coil signal substantially constant; and means responsive to the transmitter coil current for providing indications of formation resistivity.

4. In apparatus for investigating earth formations traversed by a borehole, the combination comprising: a coil array including a transmitter coil and a receiver coil adapted for movement through the borehole; circuit means for supplying current to the transmitter coil for developing in the receiver coil a signal representative of formation conductivity; phase-sensitive feedback means responsive to the resistive component of the receiver coil signal for adjusting the transmitter coil current inversely to any change in such resistive component of the receiver coil signal; and means responsive to the transmitter coil current for providing indications of formation resistivity.

5. In apparatus for investigating earth formations traversed by a borehole, the combination comprising: a coil array including a transmitter coil and a receiver coil adapted for movement through the borehole; circuit means for supplying current to the transmitter coil for developing in the receiver coil a signal representative of formation conductivity; circuit means for supplying a reference signal of predetermined magnitude; feedback means responsive to both the receiver coil signal and the reference signal for adjusting the transmitter coil current to minimize the difference between these two signals; and means responsive to the transmitter coil current for providing indications of formation resistivity.

6. In apparatus for investigating earth formations traversed by a borehole, the combination comprising: a coil array including a transmitter coil and a receiver coil adapted for movement through the borehole; circuit means for supplying alternating current to the transmitter coil for developing in the receiver coil a signal representative of formation conductivity; circuit means for supplying an alternating-current reference signal of predetermined magnitude; circuit means responsive to both the receiver coil signal and the reference signal for developing an alternating-current signal representative of the difference of these two signals; feedback means including phase sensitive detector circuit means responsive to the resistive component of the difference signal for adjusting the transmitter coil current to minimize the resistive component of the difference signal; and means responsive to the transmitter coil current for providing indications of formation resistivity.

7. In apparatus for investigating earth formations traversed by a borehole, the combination comprising: a coil array including a transmitter coil and a receiver coil adapted for movement through the borehole; variable-gain circuit means for supplying a controllable current to the transmitter coil for developing in the receiver coil a signal representative of formation conductivity; circuit means for supplying a reference signal of predetermined magnitude; circuit means responsive to both the receiver coil signal and the reference signal for developing a signal representative of the difference of these two signals; feedback means responsive to the difference signal for supplying a gain control signal to the variable-gain circuit means for adjusting the transmitter coil current to minimize the difference signal; and means responsive to the transmitter coil current for providing indications of formation resistivity.

8. In apparatus for investigating earth formations traversed by a borehole, the combination comprising: a coil array including a transmitter coil and a receiver coil adapted for movement through the borehole; variable-gain circuit means for supplying a controllable alternating current to the transmitter coil for developing in the receiver coil an alternating-current signal representative of formation conductivity; circuit means for supplying an alternating-current reference signal of predetermined magnitude; circuit means responsive to both the receiver coil signal and the reference signal for developing an alternating-current signal representative of the difference between these two signals; a phase sensitive detector circuit responsive to the difference signal for developing a direct-current control signal representative of the resistive component of the difference signal; feedback means for supplying the direct-current control signal to the variable-gain circuit means for adjusting the transmitter coil current to minimize the resistive component of the difference signal; and means responsive to the transmitter coil current for providing indications of formation resistivity.

9. In apparatus for investigating earth formations traversed by a borehole, the combination comprising: a coil array including a transmitter coil and a receiver coil adapted for movement through the borehole; circuit means for supplying current to the transmitter coil for developing in the receiver coil a signal representative of formation conductivity; first feedback means responsive to the receiver coil signal for adjusting the transmitter coil current inversely to any change in such receiver coil signal; second and phase sensitive feedback means responsive to the reactive component of the receiver coil signal for adding an opposite polarity reactive component to the receiver coil signal for minimizing the net reactive component therein; and means responsive to the transmitter coil current for providing indications of formation resistivity.

10. In apparatus for investigating earth formations traversed by a borehole, the combination comprising: a coil array including a transmitter coil and a receiver coil adapted for movement through the borehole; circuit means for supplying current to the transmitter coil for developing in the receiver coil a signal having an undesired reactive component and a desired resistive component representative of formation conductivity; feedback means responsive to the receiver coil signal for adjusting the transmitter coil current inversely to any change in such receiver coil signal; variable-gain circuit means responsive to the transmitter coil current for adding a controllable opposite-polarity reactive component to the receiver coil signal; phase sensitive detector circuit means responsive to the net reactive component in the receiver coil signal for supplying a gain control signal to the variable-gain circuit means for adjusting the added opposite-polarity reactive component to minimize the net reactive component; and means responsive to the transmitter coil current for providing indications of formation resistivity.

11. In apparatus for investigating earth formations traversed by a borehole, the combination comprising: a coil array including a transmitter coil and a receiver coil adapted for movement through the borehole; circuit means for supplying current to the transmitter coil for developing in the receiver coil a signal representative of formation conductivity; circuit means responsive to the transmitter coil current for supplying a signal representative thereof; feedback means responsive to both the receiver coil signal and the transmitter current representative signal for adjusting the transmitter coil current to hold the sum of these two signals substantially constant; and means responsive to the transmitter coil current for providing nonlinear compressed scale indications of formation resistivity.

12. In an induction well logging system wherein a current passing through a first coil produces a voltage in a second coil, for producing indications of the formations traversed by a well bore in which said first and second coils are located, the combination comprising means maintaining said voltage substantially constant, and means indicating said current required to maintain said voltage constant as a function of the resistivities of said formations.

13. In an induction well logging system wherein a current passing through a first coil produces a voltage in a second coil for producing indications of the formations traversed by a well bore within which said first and second coils are located, the combination comprising an error-detecting circuit coupled to said second coil and producing an error voltage when said voltage deviates from a constant value, means energizing said first coil, said means being controlled by said error signal to maintain said voltage constant, said current being a function of the resistivities of said formations.

14. In apparatus for investigating earth formations traversed by a borehole, the combination comprising: a coil array including a transmitter coil and a receiver coil adapted for movement through the borehole; circuit means for supplying a controllable current to the transmitter coil for developing in the receiver coil a signal representative of formation conductivity; circuit means for supplying a reference signal of predetermined magnitude; circuit means responsive to both the receiver coil signal and the reference signal for developing a signal representative of the difference of these two signals; feedback means responsive to the difference signal for supplying a gain control signal to the current supply circuit means for adjusting the transmitter coil current to minimize the difference signal; and means responsive to the transmitter coil current for providing indications of formation resistivity.

15. In an induction well logging system wherein a current passing through a first coil produces a voltage in a second coil for producing indications of an electrical characteristic of the formation traversed by a well bore within which said first and second coils are located, the combination comprising, a current source for supplying current to said first coil, means coupled to said second coil and developing a signal which is applied to said current source to control the magnitude of the supplied current in accordance with said voltage, the magnitude of said current being a function of the resistivities of said formations.

16. In an induction well logging system for producing indications of formations traversed by a well bore within which first and second coils are located wherein a current passing through said first coil produces a voltage in said second coil responsive to the resistivities of said formations, the combination comprising, first amplifying means coupled to said second coil and amplifying said voltage, a source of constant reference voltage, circuit means including detecting means and second amplifying means and being controlled in accordance with said amplified voltage and said reference voltage to develop a control voltage, an alternating current source controlled by said voltage and coupled to said first coil to supply said current thereto in accordance with said control voltage, said current being a function of the resistivities of said formations.

References Cited in the file of this patent

UNITED STATES PATENTS

| | | |
|---|---|---|
| 2,723,375 | Schuster | Nov. 8, 1955 |
| 2,729,784 | Fearon | Jan. 3, 1956 |
| 2,752,561 | Gillies | June 26, 1956 |
| 2,754,475 | Norelius | July 10, 1956 |
| 2,788,483 | Doll | Apr. 9, 1957 |
| 2,790,138 | Poupon | Apr. 23, 1957 |
| 2,803,796 | Schuster | Aug. 20, 1957 |